US012689134B2

(12) United States Patent
Adams et al.

(10) Patent No.: US 12,689,134 B2

(45) Date of Patent: Jul. 21, 2026

(54) ULTRA-WIDEBAND SIERPINSKI ANTENNA ASSEMBLY

(71) Applicant: THE BOEING COMPANY, Arlington, VA (US)

(72) Inventors: Alec Adams, Tukwila, WA (US); Darrell Mel Storvick, Tukwila, WA (US); Andrew John Shyne, Tukwila, WA (US); Stevie Sunny Thomas, Tukwila, WA (US)

(73) Assignee: THE BOEING COMPANY, Arlington, VA (US)

( * ) Notice: Subject to any disclaimer, the term of this patent is extended or adjusted under 35 U.S.C. 154(b) by 100 days.

(21) Appl. No.: 18/790,590

(22) Filed: Jul. 31, 2024

(65) Prior Publication Data

US 2026/0039029 A1 Feb. 5, 2026

(51) Int. Cl.

| | |
|---|---|
| ***H01Q 1/36*** | (2006.01) |
| ***H01Q 1/50*** | (2006.01) |
| ***H01Q 5/25*** | (2015.01) |
| ***H01Q 21/00*** | (2006.01) |
| ***H01Q 21/06*** | (2006.01) |

(52) U.S. Cl.

CPC ............. *H01Q 21/062* (2013.01); *H01Q 1/50* (2013.01); *H01Q 21/0087* (2013.01); *H01Q 21/065* (2013.01)

(58) Field of Classification Search

CPC ............. H01Q 21/0087; H01Q 21/061; H01Q 21/062; H01Q 21/065; H01Q 21/08; H01Q 21/10; H01Q 21/12; H01Q 21/296

See application file for complete search history.

(56) References Cited

U.S. PATENT DOCUMENTS

| | | | | |
|---|---|---|---|---|
| 9,368,879 | B1 * | 6/2016 | Manry, Jr. | H01Q 21/26 |
| 10,320,088 | B1 | 6/2019 | Johnson | |
| 10,741,914 | B2 * | 8/2020 | Vouvakis | H01Q 21/062 |

(Continued)

FOREIGN PATENT DOCUMENTS

| | | | |
|---|---|---|---|
| CA | 2628069 | A1 | 10/2008 |
| CN | 114696072 | A | 7/2022 |

OTHER PUBLICATIONS

Extended European search report mailed Nov. 28, 2025 for corresponding Application No. 25190938.8 (11 pages).

(Continued)

*Primary Examiner* — Dimary S Lopez Cruz

*Assistant Examiner* — Marin Stoytchev Stoytchev

(74) *Attorney, Agent, or Firm* — Carroll, Hoette & Butscher, LLC; Christopher R. Carroll

(57) ABSTRACT

An antenna assembly can include unit cells having dipole arms for communication of radio frequency (RF) signals. The unit cells include first dielectric boards with metallic layers on the dielectric boards forming the dipole arms. The antenna assembly also can include coupling devices connecting neighboring pairs of the unit cells. The coupling devices can have second dielectric boards with conductive segments spaced apart from each other. Each of the coupling devices can be connected with and extending between the unit cells in each of the neighboring pairs of the unit cells with each of the conductive segments of each of the coupling devices contacting the first dielectric boards in the unit cells in each of the neighboring pairs.

20 Claims, 10 Drawing Sheets

(56) References Cited

U.S. PATENT DOCUMENTS

| | | | | |
|---|---|---|---|---|
| 11,652,299 B2 * | 5/2023 | Livadaru | H01Q 9/285 | |
| | | | 343/702 | |
| 2012/0212380 A1 * | 8/2012 | Theobold | G01S 13/88 | |
| | | | 343/720 | |

OTHER PUBLICATIONS

Wang Bingjun et al: "An Ultra-wideband Dual-Polarized Low-Profile Tightly Coupled Dipole Array", 2021 IEEE International Symposium on Antennas and Propagation and USNC-URSI Radio Science Meeting (APS/URSI), IEEE, Dec. 4, 2021 (Dec. 4, 2021), pp. 1193-1194, XP034084642, DOI: 10.1109/APS/URSI47566.2021.9704203.

J.P. Doane, K. Sertel, and J.L. Volakis, "A 6.3:1 Bandwidth Scanning Tightly Coupled Dipole Array with Co-Designed Compact Balun," in Antennas and Propagation Society International Symposium. Jul. 2012.

S.S. Holland, M.N. Vouvakis, "The Planar Ultra-wideband Modular Antenna (PUMA) Array," IEEE Trans. Ants. Prop, 60(1), 130-140, 2012.

M. Jones and J. Rawnick, "A New Approach to Broadband Array Design Using Tightly Coupled Elements," in Proc. IEEE MILCOM, Oct. 29-31, 2007.

E.G. Magill and H.A. Wheeler, "Wide-angle matching of a planar array antenna be a dielectric sheet," in Antennas and Prop. International Symposium, vol. 3, pp. 164-169, Aug. 1965.

M. H. Novak, F. A. Miranda, and J.L. Volakis, "Ultra-wideband phased array for small satellite communications," IET Microwaves, Antennas & Propagation., vol. 11, pp. 1234-1240, Sep. 2017.

C. Puente-Baliarda, J. Romeu, R. Pous and A. Cardama, "On the behavior of the Sierpinski multiband fractal antenna," in IEEE Transactions on Antennas and Propagation, vol. 46, No. 4, pp. 517-524, Apr. 1998, doi: 10.1109/8.664115.

H.H. Vo, C.-C. Chen, P. Hagan, and Y. Bayram, "A Very Low-Profile UWB Phased Array Antenna Design for Supporting Wide Angle Beam Steering," in Proc. IEEE International Symposium on Phased Array Systems and Technology, Oct. 2016.

H.A. Wheeler: 'Simple relations derived from a phased-array antenna made of an infinite current sheet', IEEE Trans. Antennas Prop., vol. 13, No. 4, pp. 506-514, 1965.

B.A. Munk et al., "A low-profile broadband phased array antenna," in Proc. IEEE Ants. Prop. International Symposium, vol. 2, pp. 448-451, Jun. 2003.

* cited by examiner

ULTRA-WIDEBAND SIERPINSKI ANTENNA ASSEMBLY

BACKGROUND

Field

Examples of the subject matter described herein relate to antenna assemblies for phased arrays, and particularly ultra-wideband Sierpinski unit cell antenna assemblies.

Description of Related Art

Sierpinski antennas can operate across many frequency bands with a compact design due to the fractal patterns of the antennas providing larger electrical lengths within reduced areas. These antennas can be formed from several unit cells coupled with each other. While some known Sierpinski antennas can operate across several frequency bands, the impedance bandwidths for these antennas may be insufficient for some uses, such as some communication systems (e.g., mobile communication systems), radar systems, and the like. A need may exist for Sierpinski antennas having wider impedance bandwidths.

BRIEF SUMMARY

In one example, an antenna assembly can include unit cells having dipole arms for communication of radio frequency (RF) signals. The unit cells include first dielectric boards with metallic layers on the dielectric boards forming the dipole arms. The antenna assembly also can include coupling devices connecting neighboring pairs of the unit cells. The coupling devices can have second dielectric boards with conductive segments spaced apart from each other. Each of the coupling devices can be connected with and extending between the unit cells in each of the neighboring pairs of the unit cells with each of the conductive segments of each of the coupling devices contacting the first dielectric boards in the unit cells in each of the neighboring pairs.

In another example, an antenna assembly can include unit cells with fractal dipole arms for communication of RF signals. The antenna assembly also can include coupling devices connecting neighboring pairs of the unit cells. The coupling devices can have dielectric boards with conductive segments spaced apart from each other. The coupling devices can connect the unit cells in the neighboring pairs with the conductive segments contacting the unit cells to capacitively couple the unit cells with each other and maintain a designated separation gap between the unit cells.

In one example, a method can include obtaining unit cells having dipole arms for communication of RF signals. The unit cells can include first dielectric boards with metallic layers on the dielectric boards forming the dipole arms. The method also can include connecting neighboring pairs of the unit cells with coupling devices having second dielectric boards with conductive segments spaced apart from each other. The neighboring pairs of the unit cells can be connected with each other by the coupling devices with each of the conductive segments of each of the coupling devices contacting the first dielectric boards in the unit cells in each of the neighboring pairs.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

One or more examples of the inventive subject matter described herein provide ultra-wideband electronically scanned phased array Sierpinski antenna assemblies. The antenna assemblies may be formed from unit cells in a rectangular lattice. The antenna assemblies can be dual polarized antennas that include dielectric board-based radiators having surface mounted baluns that connect with coaxial fees, dielectric board-based capacitive coupling elements that connect the unit cells of the antenna assemblies, and dielectric standoff devices that couple and space the antenna assemblies from ground planes. The unit cells can be connected with each other by the dielectric board-based capacitive coupling devices that may include dielectric boards or substrates with printed metallic segments. These coupling devices can capacitively couple the Sierpinski dipole antenna unit cells either on a top side or bottom side of the unit cells. These capacitive coupling devices can increase the impedance bandwidth of the Sierpinski dipole antenna unit cells (2:1 bandwidth to 5:1 bandwidth as one example).

The antenna assemblies can be used to communicate (e.g., send and/or receive) wireless signals with vehicles or other devices, including aircraft or other mobile vehicles. The antenna assemblies may be able to communicate ultra-wideband electronically scanning antenna array beams without any mechanical moving parts of the antenna assemblies. The antenna assemblies can be used in communication systems, radar systems, military systems, or the like.

Figure 1:
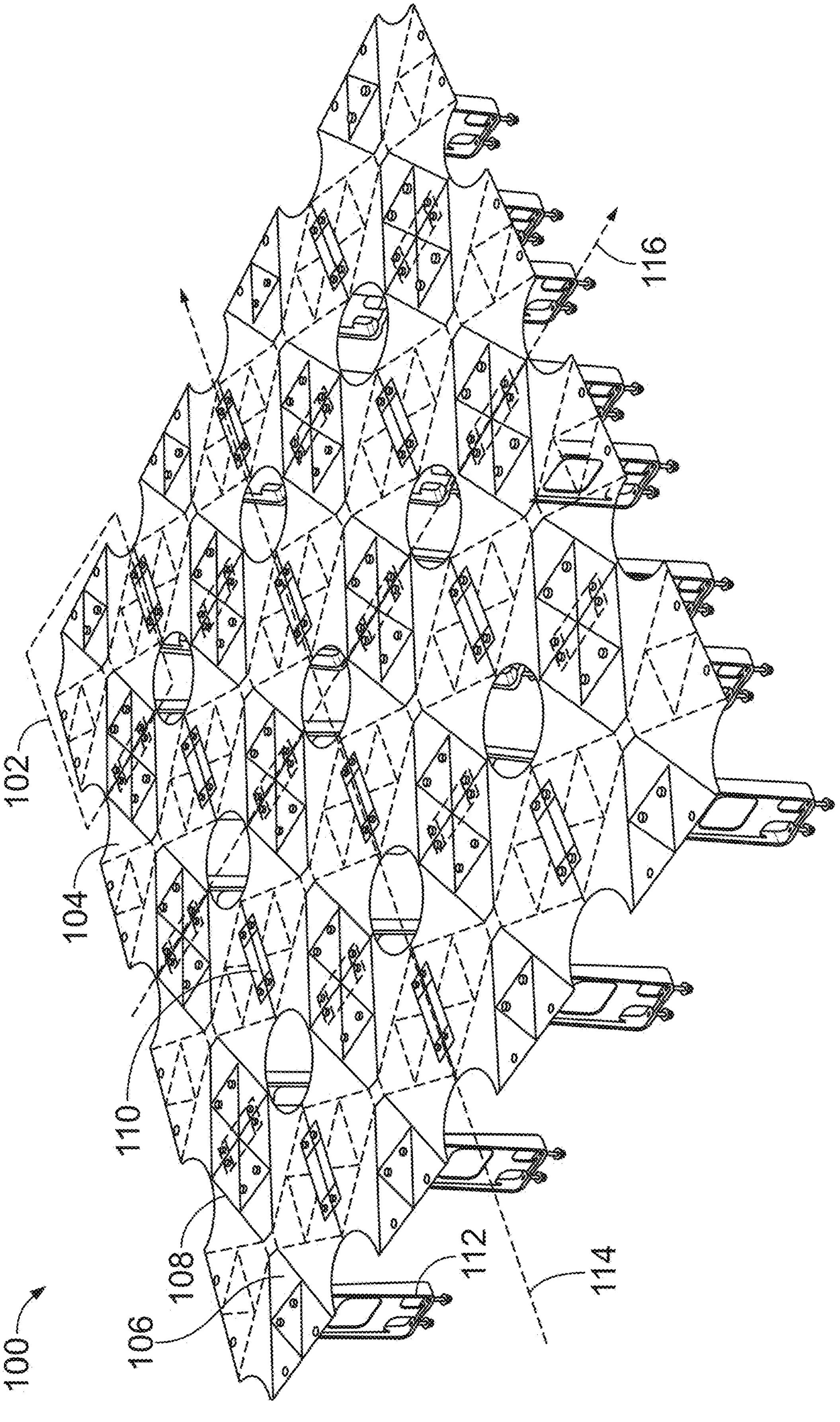
FIG. 1 illustrates one example of an antenna assembly.

FIG. 1 illustrates one example of an antenna assembly 100. The antenna assembly 100 can be a Sierpinski antenna formed from multiple antenna unit cells 102 arranged in an array. There are sixteen unit cells 102 in the illustrated example of the antenna assembly 100, but optionally there may be fewer or more unit cells 102 in the antenna assembly 100. The unit cells 102 may be formed from dielectric boards or substrates 104 with conductive segments 106, 108 that are metallic dipole arms of the unit cells 102. In the illustrated example, the conductive segments 106, 108 of the unit cells 102 are formed as triangular fractals (or in another shape). The dipole arms 106, 108 may be formed from metallic layers on the dielectric boards 104 of the unit cells 102. The dipole arms 106, 108 can be the radiating elements of the antenna assembly 100. The dielectric boards or substrates 104 may be formed from dielectric materials, such as printed circuit board materials (e.g., flame retardant 4, or FR-4), composite epoxy materials, polyimide, high-frequency laminates (e.g., polytetrafluoroethylene), or the like. In one example, each of the unit cells 102 may be identical in shape and size as every other unit cell 102 in the antenna assembly 100 (e.g., within manufacturing tolerances).

Each unit cell 102 can include two sets of the dipole arms 106, 108 oriented orthogonal to each other within the unit cell 102. These sets of the dipole arms 106, 108 can form linear or circularly-polarized radio waves at the antenna aperture of the antenna assembly 100 by adjusting the amplitude and phase (or time delay) of radio frequency (RF) signals into (or from) each dipole arm 106, 108. The two signals can share a common connector (described below) to reduce the number of connectors needed across the antenna assembly 100.

The unit cells 102 are connected to each other by capacitive coupling devices 110. As described below, these capacitive coupling devices 110 form capacitive couplings between the unit cells 102 and maintain spacing between the unit cells 102 to within tight tolerances. This can significantly increase the impedance bandwidth of the antenna assembly 100. The antenna assembly 100 can be mounted to a ground plane using several dielectric standoff devices 112 that also are described below. Although the ground plane is not shown in FIG. 1, the ground plane may be parallel to the unit cells 102 and located at or along ground plane ends of the standoff devices 112 that are opposite to antenna ends of the standoff devices 112 that are coupled with bottom sides of the unit cells 102.

Figure 2:
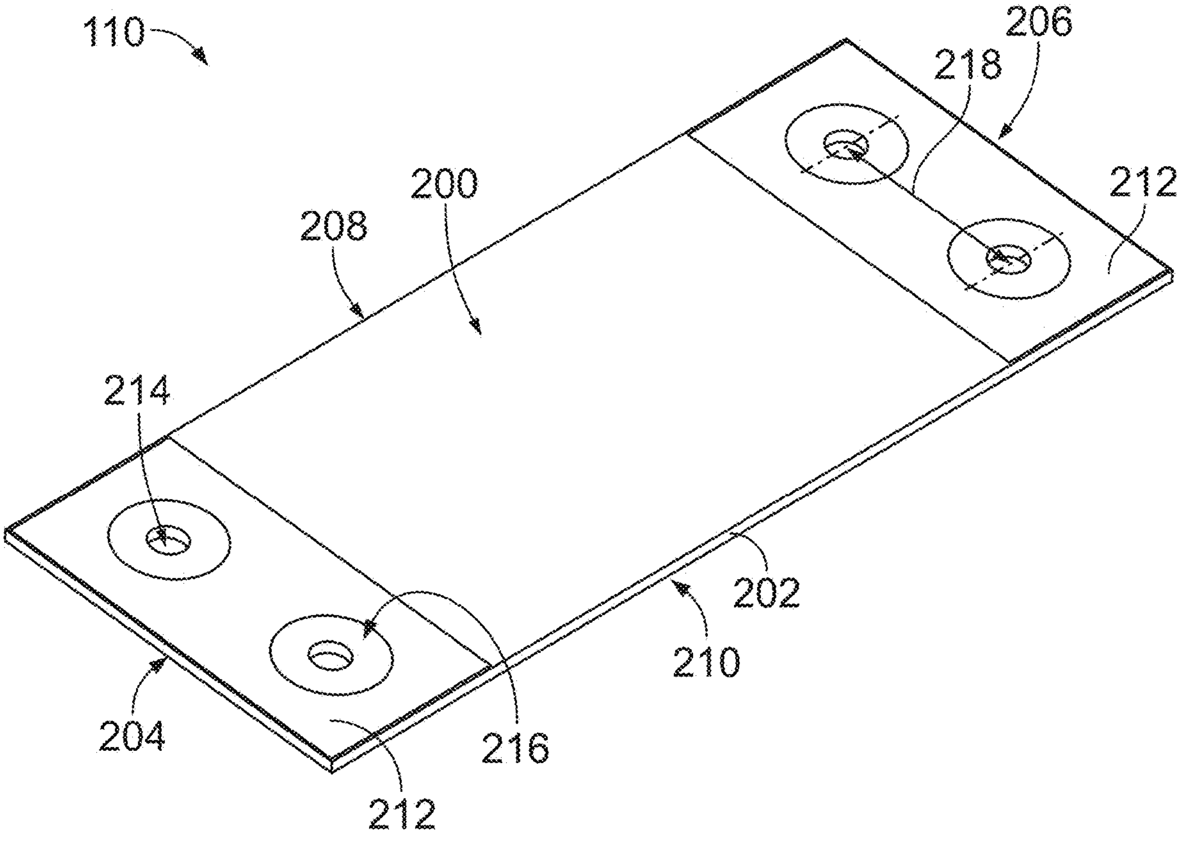
FIG. 2 illustrates a perspective view of a coupling side of a capacitive coupling device shown in FIG. 1.
Figure 3:
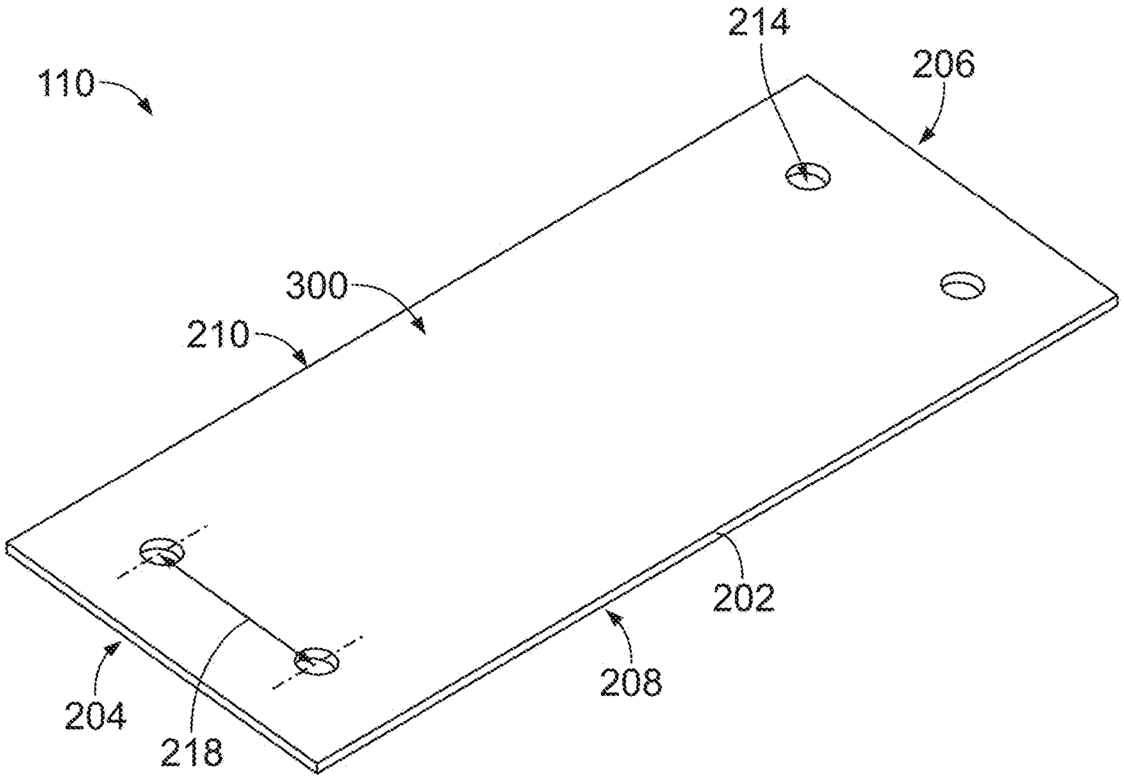
FIG. 3 illustrates a perspective view of an opposite back side of the capacitive coupling device shown in FIGS. 1 and 2.
Figure 4:
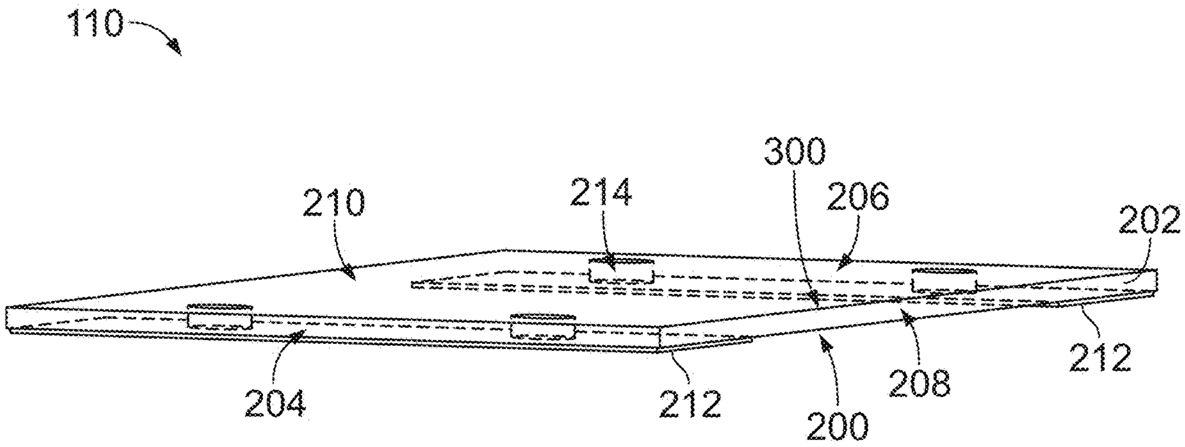
FIG. 4 illustrates another perspective view of the back side of the capacitive coupling device shown in FIGS. 1 through 3.

FIG. 2 illustrates a perspective view of a coupling side 200 of the capacitive coupling device 110 shown in FIG. 1. FIG. 3 illustrates a perspective view of an opposite back side 300 of the capacitive coupling device 110 shown in FIGS. 1 and 2. FIG. 4 illustrates another perspective view of the back side 300 of the capacitive coupling device 110 shown in FIGS. 1 through 3. The capacitive coupling device 110 includes a dielectric board or substrate 202. This dielectric board or substrate 202 may be formed from the same or different dielectric material as the dielectric boards or substrates 104 (shown in FIG. 1) of the unit cells 102. The capacitive coupling device 110 is elongated (e.g., longer) in a first direction from one end edge 204 to an opposite end edge 206. The capacitive coupling device 110 also extends in a second, perpendicular direction from one lateral edge 208 to an opposite lateral edge 210.

While the capacitive coupling device 110 is shown as having a rectangular shape, alternatively, the capacitive coupling device 110 may have another polygon shape, a non-polygonal shape (e.g., a curved shape with no linear edges), or a combination of linear and non-linear edges. The capacitive coupling device 110 is longer in the first direction than the second direction, but optionally can be longer in the second direction than the first direction, or may have the same length in both the first and second directions.

The coupling side 200 includes conductive segments 212 formed from one or more conductive materials (e.g., metals or metal alloys). The conductive segments 212 may be formed on the coupling side 200 by depositing the conductive material(s) onto the coupling side 200 and then etching the conductive material(s) away to leave the conductive segments 212. As a result, the conductive segments 212 may be disposed on top of the coupling side 200, as opposed to extending or penetrating into the coupling side 200. Optionally, the conductive segments 212 may extend into the coupling side 200. For example, portions of the board 202 may be etched or otherwise removed in locations where the conductive segments 212 are formed so that the conductive segments 212 are coextensive with the coupling side 200 and do not extend above or beyond the coupling side 200.

Each of the conductive segments 212 may extend from one lateral edge 208 or 210 to the opposite lateral edge 210 or 208 with no gaps or space between the edges of the conductive segments 212 and the lateral edges 208, 210. Additionally, each of the conductive segments 212 also can extend from one end edge 204 or 206 toward the other end edge 206 or 204, but not extend entirely to the other end edge 204, 206. For example, the conductive segments 212 can be spaced apart from each other by a segment of the dielectric board 202 so that the conductive segments 212 are not conductively coupled with each other within the coupling device 110. Optionally, the conductive segments 212 may not extend entirety to the lateral edge 208 and/or 210. As another option, one or more of the conductive segments 212 may be spaced apart from the end edge 204, 206 (that is closer to the conductive segment 212) such that part of the dielectric board 202 is exposed between the conductive segment 212 and the end edge 204, 206 closest to that conductive segment 212.

The dielectric board 202 of the coupling device 110 can include through holes 214 for fasteners to secure the coupling device 110 to the unit cells 102 (as described below). The conductive segments 212 can include holes or gaps 216 around the board through holes 214. The board through holes 214 can extend entirely through the thickness of the dielectric board 202 from the coupling side 200 to the back side 300 of the board 202. The conductive segment holes 216 may extend entirely through the thickness of the conductive segments 212. The holes 214, 216 may be coaxial with each other, or one of the holes 214, 216 may be shifted so that the holes 214, 216 are not coaxial with each other. The conductive segment holes 216 may be larger (e.g., have a larger diameter) than the board holes 214. This can prevent the conductive segments 212 from contacting and being conductively coupled with fasteners that secure the coupling device 110 to the unit cells 102, as described below. While four board holes 214 and four conductive segment holes 216 are shown, the coupling device 110 optionally may have a different number of the holes 214, 216. Additionally, while each conductive segment 212 includes two holes 216, one or both the conductive segments 212 may have additional holes 216.

Figure 5:
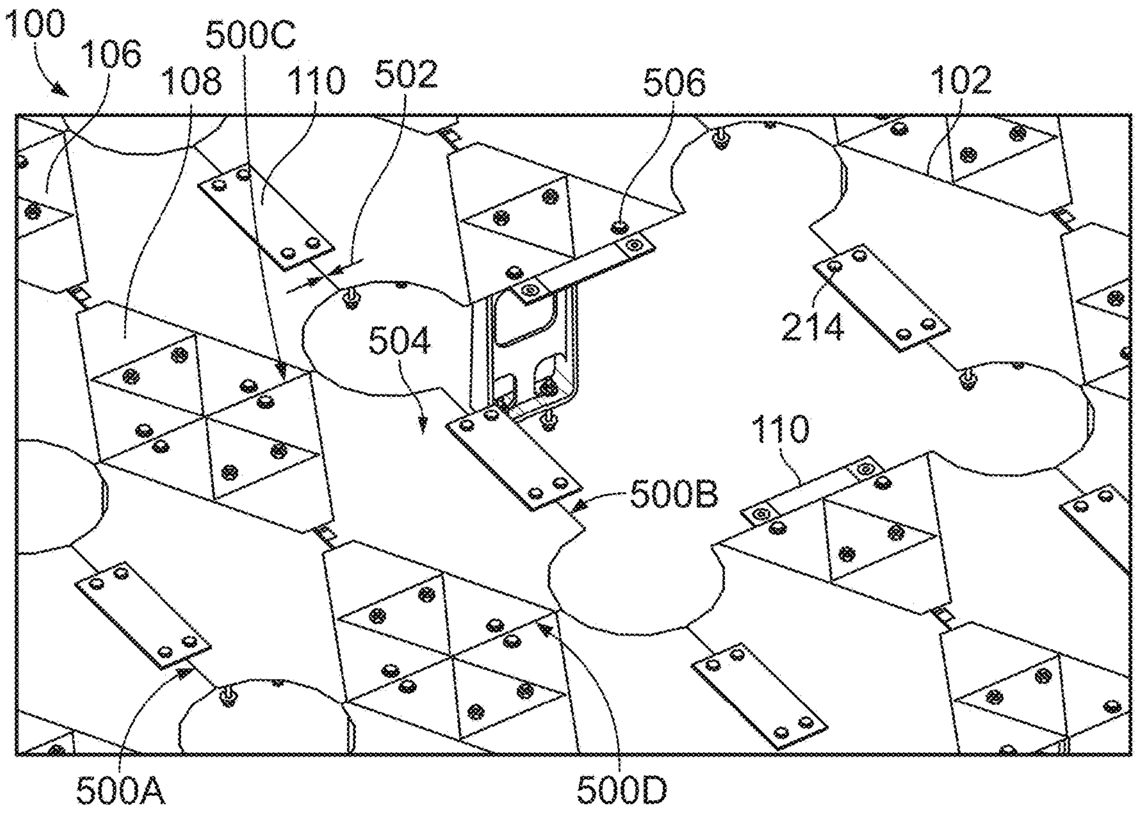
FIG. 5 illustrates a portion of the antenna assembly shown in FIG. 1 with a unit cell removed according to one example.
Figure 6:
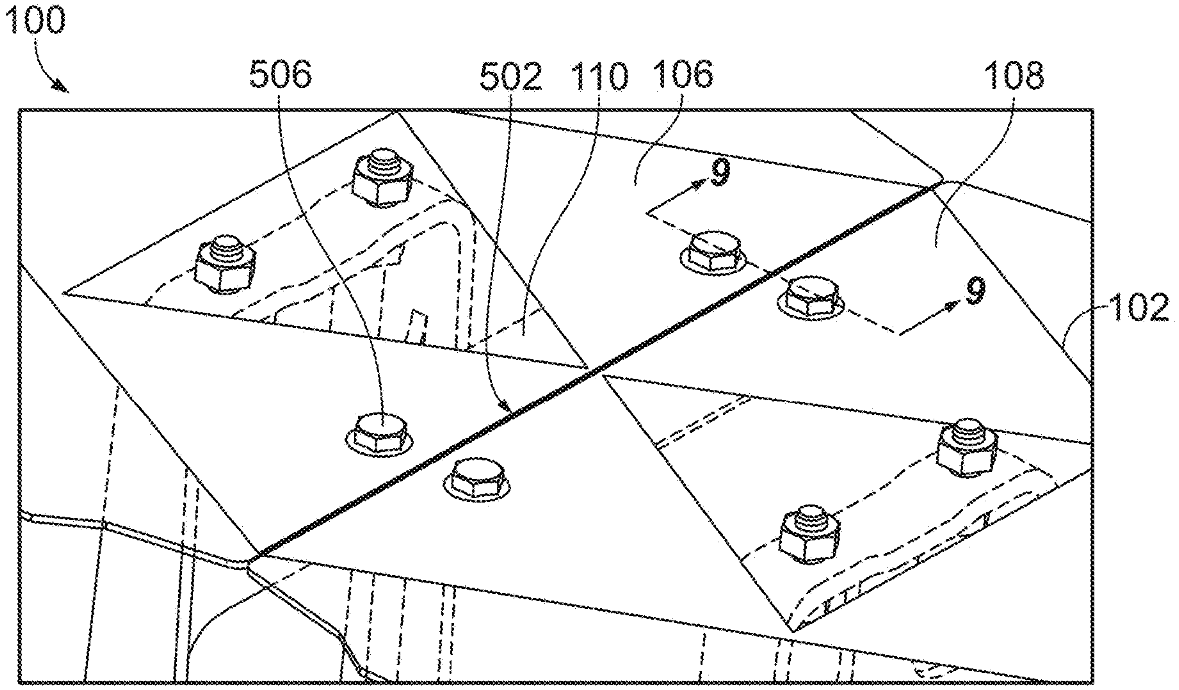
FIG. 6 illustrates neighboring unit cells in the antenna assembly connected by the capacitive coupling device shown in FIGS. 2 through 4.
Figure 7:
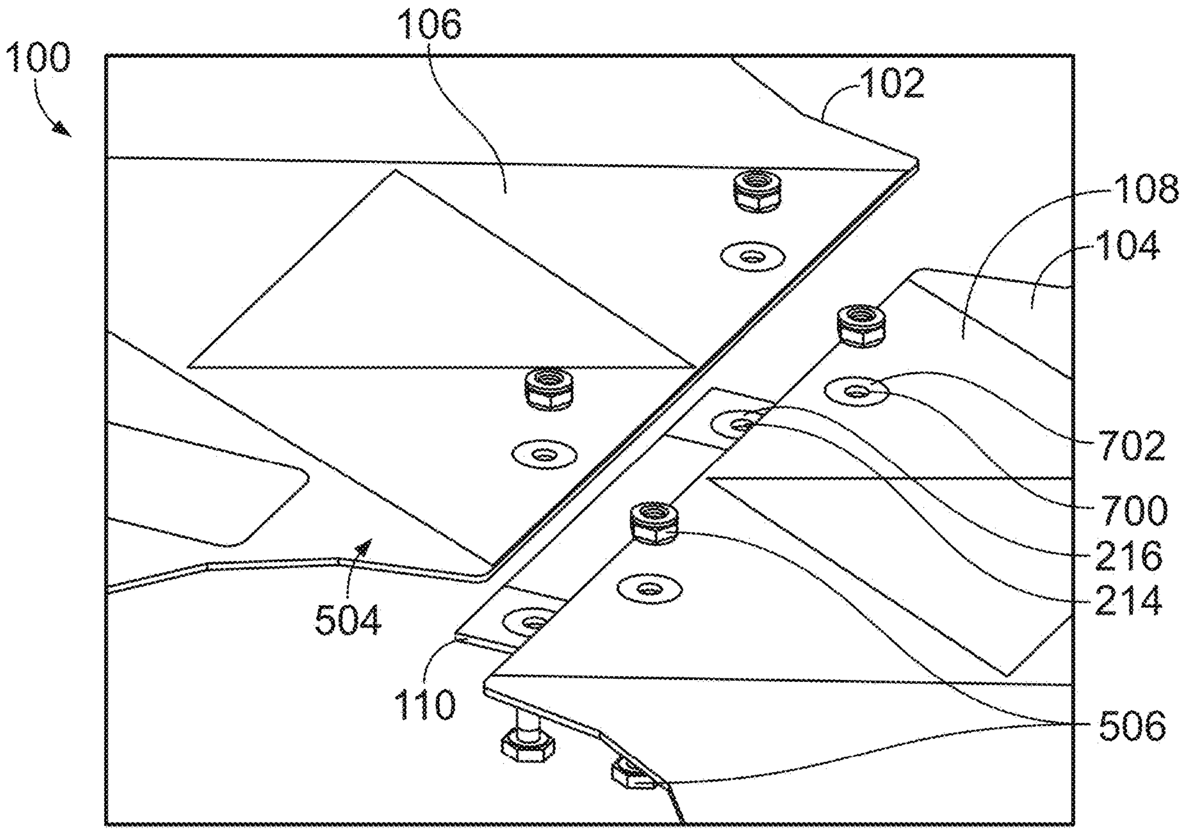
FIG. 7 illustrates a first exploded view of neighboring unit cells and the capacitive coupling device shown in FIG. 6.
Figure 8:
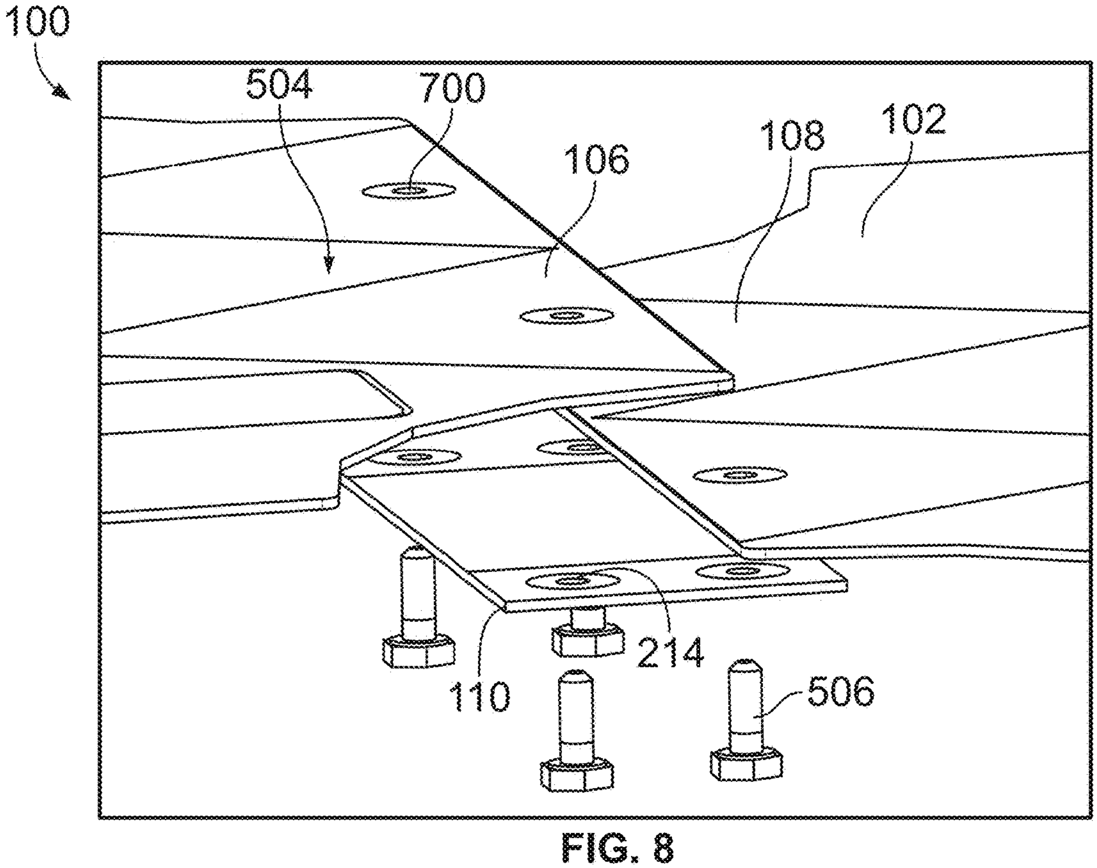
FIG. 8 illustrates a second exploded view of the neighboring unit cells and the capacitive coupling device shown in FIGS. 6 and 7.
Figure 9:
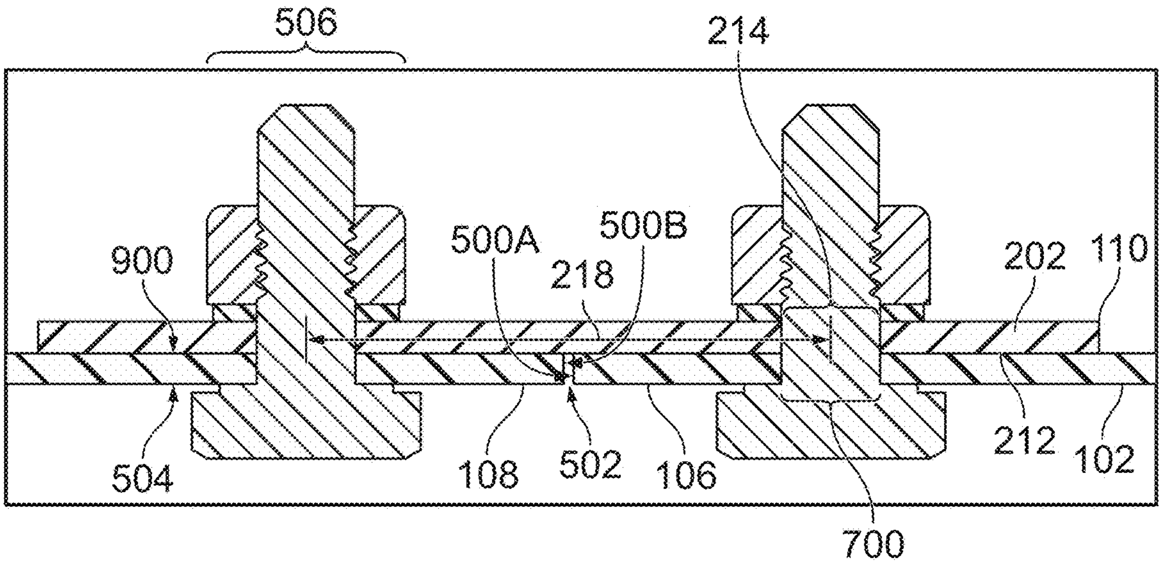
FIG. 9 illustrates a cross-sectional view of the neighboring unit cells and the capacitive coupling device along line 9-9 shown in FIG. 6.

FIG. 5 illustrates a portion of the antenna assembly 100 shown in FIG. 1 with one of the unit cells 102 removed according to one example. FIG. 6 illustrates neighboring unit cells 102 in the antenna assembly 100 shown in FIG. 1 connected by the capacitive coupling device 110 shown in FIGS. 2 through 4. FIG. 7 illustrates a first exploded view of the neighboring unit cells 102 and the capacitive coupling device 110 shown in FIG. 6. FIG. 8 illustrates a second exploded view of the neighboring unit cells 102 and the capacitive coupling device 110 shown in FIGS. 6 and 7. FIG. 9 illustrates a cross-sectional view of the neighboring unit cells 102 and the capacitive coupling device 110 along line 9-9 shown in FIG. 6.

Each of the unit cells 102 can have four outer edges 500A-D with pairs of the outer edges 500 opposing each other. For example, the outer edges 500A, 500B are opposite each other across the unit cell 102 and the outer edges 500C, 500D are opposite each other across the unit cell 102). Each of the capacitive coupling devices 110 is connected to two neighboring unit cells 102 to mechanically couple the unit cells 102 with each other. For example, a capacitive coupling device 110 may be disposed across a gap 502 between the outer edges 500A-D of the neighboring unit cells 102 that face each other. This gap 502 may be a dielectric gap (e.g., an air gap) in that the outer edges 500A-D of the neighboring unit cells 102 do not contact or abut each other.

Each of the coupling devices 110 can be connected with each of the neighboring unit cells 102 with the coupling device 110 directly contacting or abutting a top side 504 (first labeled in FIG. 5) or a bottom side 900 (first labeled in FIG. 9) of the unit cells 102. For example, as shown in FIG. 9, the coupling devices 110 may directly contact the top sides 504 or the bottom sides 900 of the neighboring unit cells 102 without any intervening object, layers, etc. between the coupling devices 110 and the top sides 504 or the bottom sides 900 of the unit cells 102. Each conductive segment 212 of a capacitive coupling device 110 may directly contact or abut the top sides 504 of the unit cells 102 that are coupled with each other by that coupling device 110 connected to the top sides 504 of the unit cells 102 (as shown in FIG. 5). Each conductive segment 212 of a capacitive coupling device 110 may directly contact or abut the bottom sides 900 of the unit cells 102 that are coupled with each other by that coupling device 110 connected to the bottom sides 900 of the unit cells 102 (as shown in FIGS. 5 and 9).

In the illustrated example, different pairs of the coupling devices 110 connected to the same unit cell 102 can be coupled to different sides 504, 900 of the unit cell 102. The coupling devices 110 in one pair may be coupled to the top side 504 of the unit cell 102. The coupling devices 110 in the other pair may be coupled to the bottom side 900 of the same unit cell 102. Optionally, all coupling devices 110 connected to the same unit cell 102 may be connected to the top side 504 or the bottom side 900. As another option, three of the coupling devices 110 connected to the same unit cell 102 can be connected to the top side 504 or the bottom side 900 while the remaining coupling device 110 connected to that unit cell 102 can be connected to the other of the bottom side 900 or the top side 504.

The coupling devices 110 along the top sides 504 of the unit cells 102 in the array of the antenna assembly 100 can be arranged in or along linear paths that are parallel to each other and parallel to one direction 114 (shown in FIG. 1). The coupling devices 110 along the bottom sides 900 of the unit cells 102 in the antenna assembly 100 can be arranged in or along linear paths that are parallel to each other and parallel to another direction 116 (shown in FIG. 1). The directions 114, 116 may be perpendicular to each other. Optionally, the coupling devices 110 may be in another arrangement. For example, the coupling devices 110 may all be beneath the unit cells 102, the coupling devices 110 may all be above the unit cells 102, or the coupling devices 110 may be in another arrangement with some coupling devices 110 above the unit cells 102 and other coupling devices 110 below the unit cells 102.

As described above, each of the coupling devices 110 can be connected to the unit cells 102 such that each of the conductive segments 212 contacts both the unit cells 102 that are connected the coupling device 110. For example, the coupling devices 110 may be placed against the unit cells 102 with the conductive segments 212 facing and contacting the unit cells 102. The conductive segments 212 may contact the dielectric boards 104 of the unit cells 102 and not the conductive segments 106, 108 (e.g., the dipole arms) of the unit cells 102. For example, with respect to the coupling devices 110 connected to the top sides 504 of the unit cells 102, each conductive segment 212 of those coupling devices 110 can be located between, but not contacting, the dipole arms 106, 108. Each of the conductive segments 212 of the coupling devices 110 on the bottom sides 900 of the unit cells 102 are located beneath the dipole arms 106, 108. As a result, the conductive segments 212 are spaced apart from, and do not contact, the dipole arms 106, 108 by the dielectric boards 104 of the unit cells 102.

Fasteners 506 can be used to couple the coupling devices 110 to the unit cells 102 and to couple the unit cells 102 with each other using the coupling devices 110. The fasteners 506 can be pairs of threaded bolts and nuts that connect with each other on opposite sides of the coupling devices 110 and the unit cells 102. The fasteners 506 can be placed through the through holes 214 in the coupling devices 110 and through holes 700 extending through the dielectric boards 104 of the unit cells 102 (shown in FIG. 7). Similar to the conductive gaps or holes 216 in the conductive segments 212 of the coupling devices 110, the unit cells 102 can include conductive gaps or holes 702. These conductive gaps 702 can extend around the through holes 702 in the dielectric boards 104.

The through holes 700 can extend entirely through the thickness of the dielectric boards 104. The conductive segment holes 702 may extend entirely through the thickness of the conductive layers forming the dipole arms 106, 108. The holes 700, 702 may be coaxial with each other, or one of the holes 700, 702 may be shifted so that the holes 700, 702 are not coaxial with each other. The conductive segment holes 702 may be larger (e.g., have a larger diameter) than the board holes 700. This can prevent the conductive dipole arms 106, 108 from contacting and being conductively coupled with the fasteners 506.

The larger conductive holes 216, 702 are large enough to prevent contact between the dipole arms 106, 108 of the unit cells 102 and the fasteners 506, and between the conductive segments 212 of the coupling devices 110 and the fasteners

506. This can allow the conductive segments 212 of the coupling devices 110 to capacitively couple the neighboring unit cells 102 without the fasteners 506 forming a conductive path or bridge between the dipole arms 106, 108 and the conductive segments 212.

The pairs of through holes 214 extending through each conductive segment 212 in the coupling devices 110 may be spaced apart by a designated separation distance 218. This separation distance 218 may be measured as the shortest distance from the center or center axis of one through hole 214 to the center or center axis of the other through hole 214 extending through the same conductive segment 212. The coupling devices 110 can be fabricated so that the separation distance 218 keeps the outer edges 500A-D of the neighboring unit cells 102 spaced apart by the separation gap 502. While the edges 500A, 500B are shown in FIG. 9, optionally the edges shown in FIG. 9 may be the edges 500C, 500D.

The width of the separation gap 502 may be design or selected based on a desired impedance of the capacitive coupling between the unit cells 102 that is provided by the coupling device 110. For example, a first impedance may be provided by the capacitive coupling between the unit cells 102 joined by the coupling device 110 with a first separation distance 218, a different, second impedance may be provided by a different, second separation distance 218, and so on. The fabricator or manufacture of the coupling device 110 can be performed to have the separation distance 218 that provides the desired impedance provided by the capacitive coupling between the unit cells 102. Additionally, the thickness of the dielectric board 202 and/or the metal or metal alloy forming the conductive segments 212 can be selected to control this impedance. For example, the thickness of the dielectric board 202, the thickness of the conductive segments 212, and the separation distance 218 of where the coupling device 110 is connected to the unit cells 102 can be selected to control the impedance of the capacitive coupling between the unit cells 102. This can allow the impedance bandwidth of the unit cells 102 to be controlled by the dimensions of the coupling devices 110, as the antenna assembly 100 will have different impedance bandwidths with different impedances of the capacitive couplings provided by the coupling devices 110.

Figure 10:
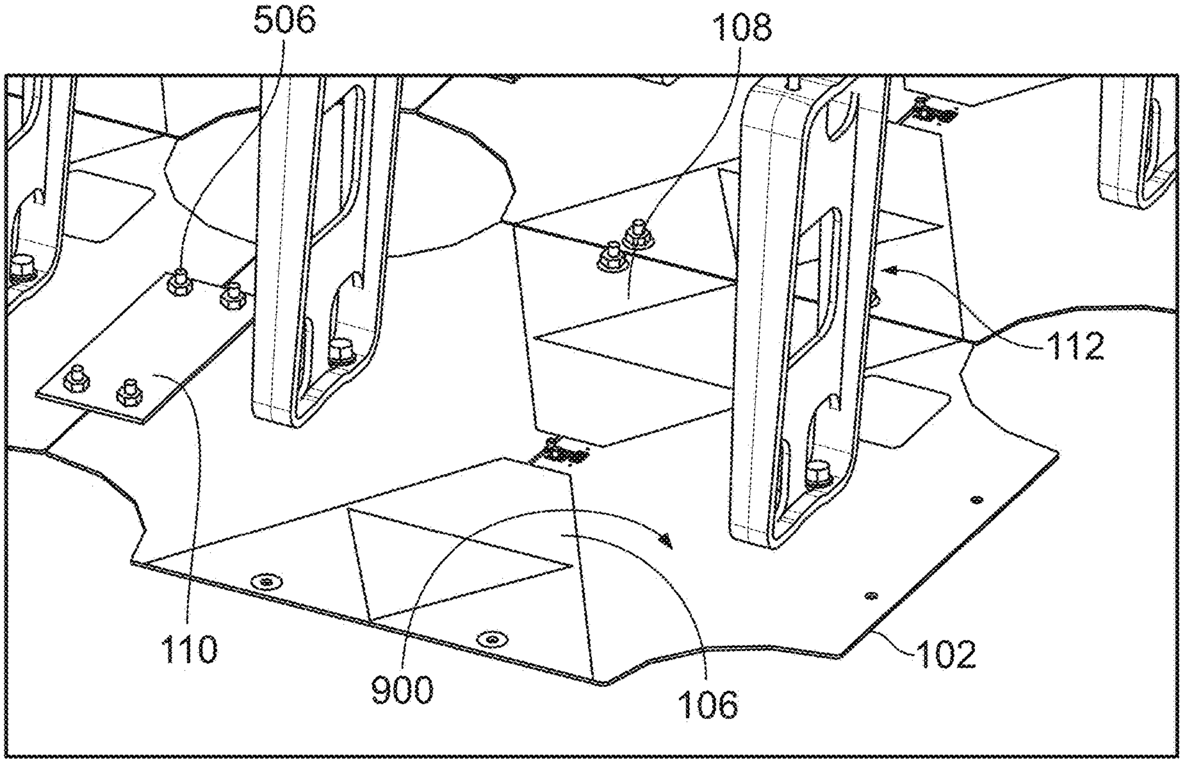
FIG. 10 illustrates a perspective view of one example of dielectric standoff devices connected to the antenna assembly.
Figure 11:
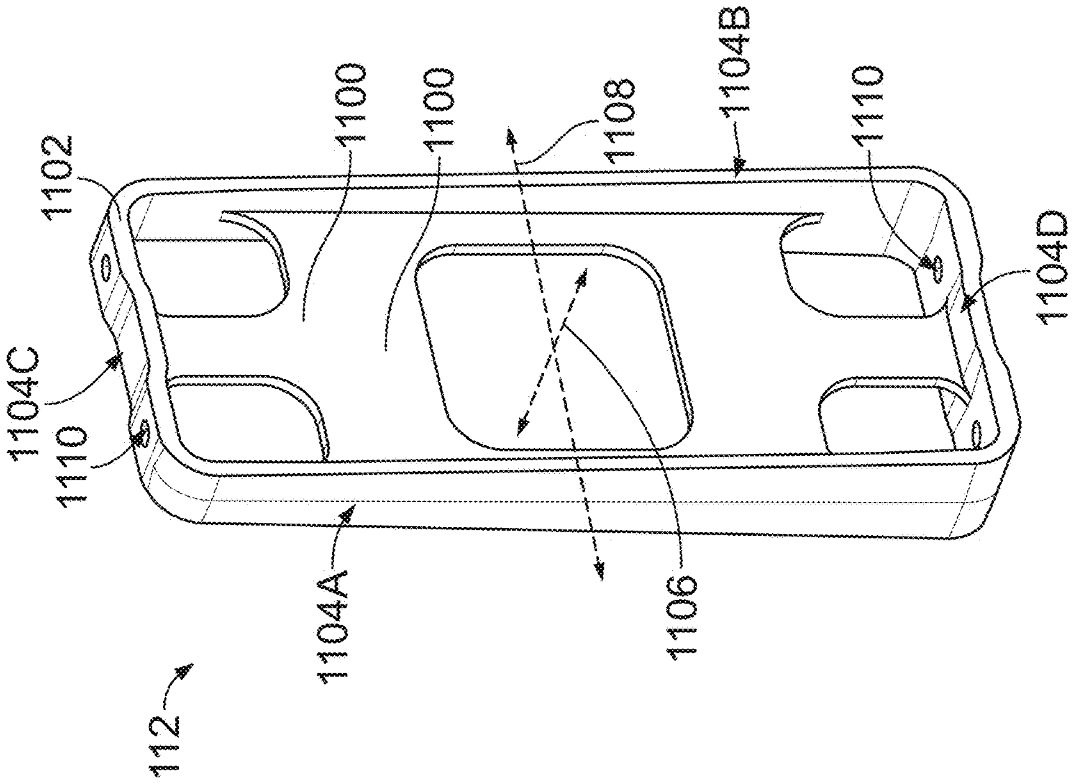
FIG. 11 illustrates a perspective view of one of the dielectric standoff devices shown in FIG. 10.
Figure 12:
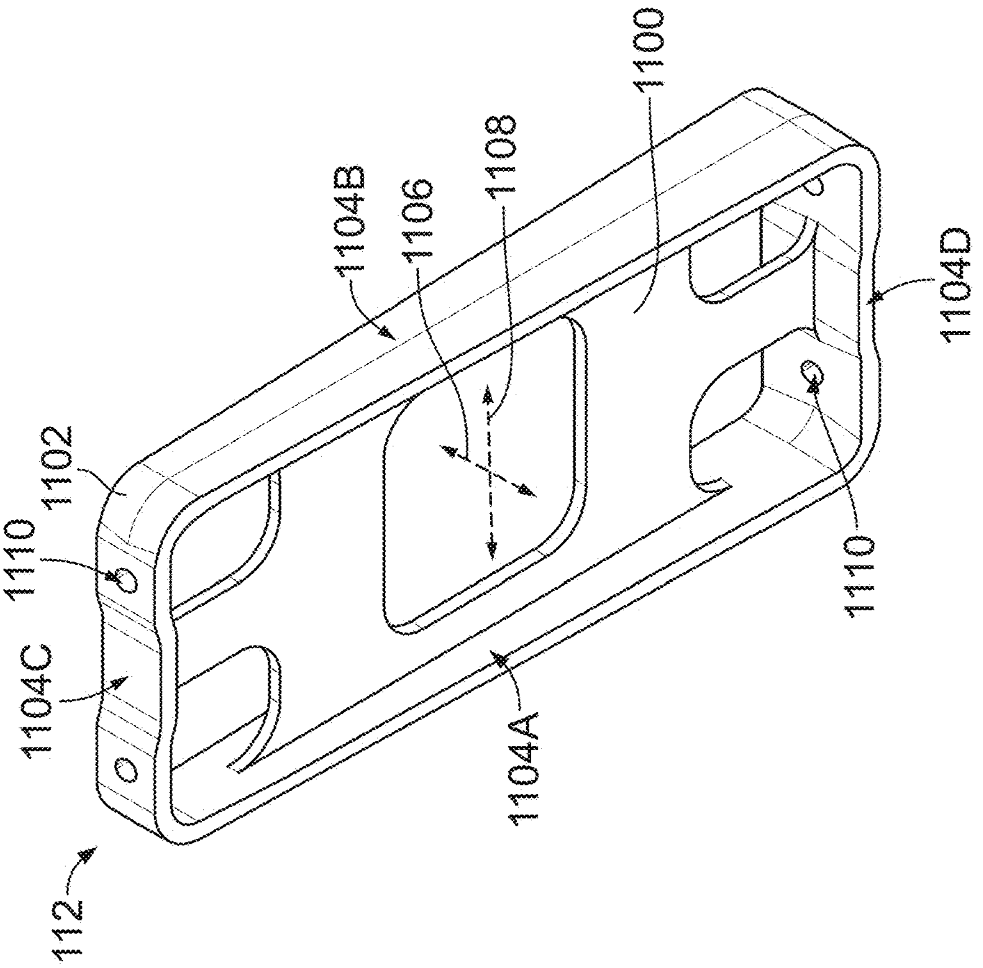
FIG. 12 illustrates another perspective view of the dielectric standoff device shown in FIG. 11.
Figure 13:
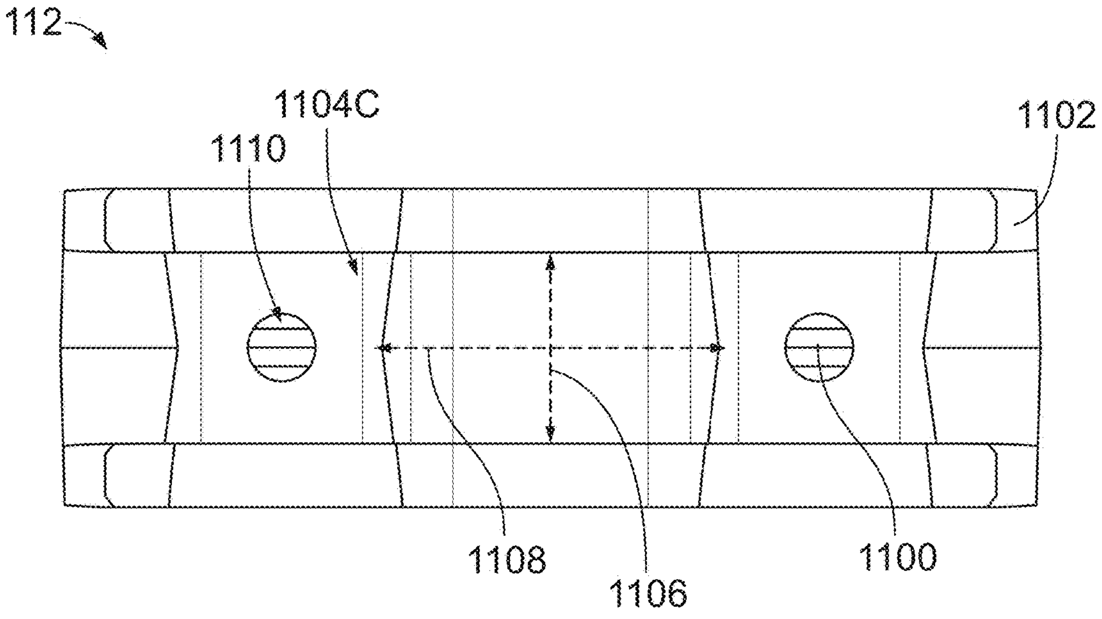
FIG. 13 illustrates a top view of the dielectric standoff device shown in FIGS. 11 and 12.
Figure 14:
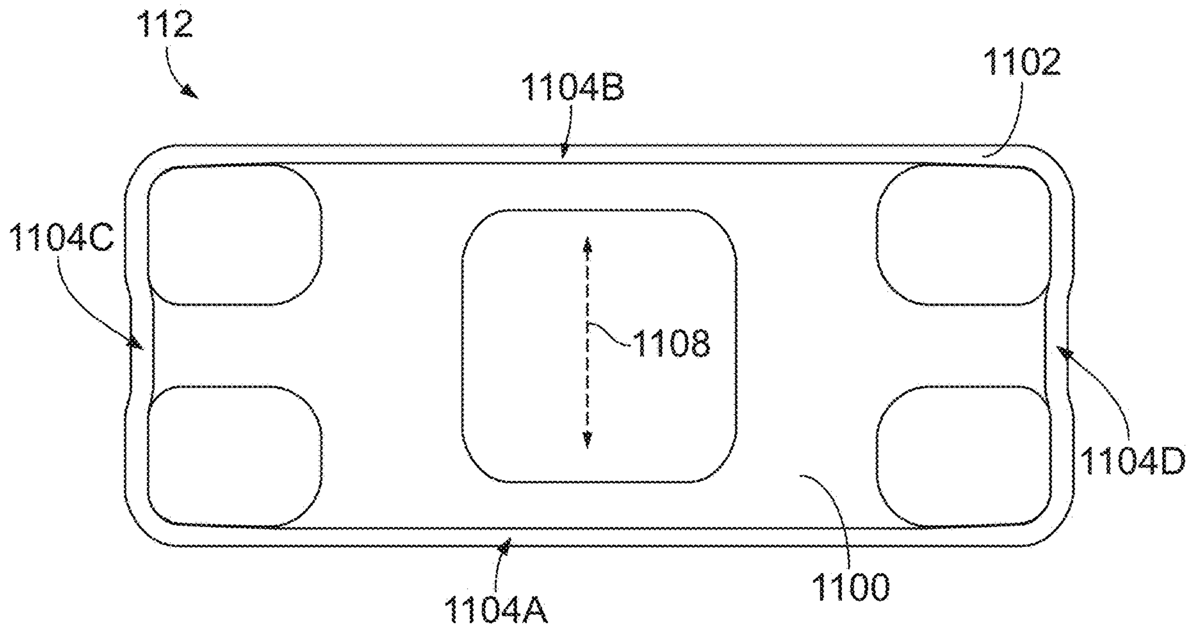
FIG. 14 illustrates an elevational view of the dielectric standoff device shown in FIGS. 11 through 13.

FIG. 10 illustrates a perspective view of one example of the dielectric standoff devices 112 connected to the antenna assembly 100. FIG. 11 illustrates a perspective view of one of the dielectric standoff devices 112 shown in FIG. 10. FIG. 12 illustrates another perspective view of the dielectric standoff device 112 shown in FIG. 11. FIG. 13 illustrates a top view of the dielectric standoff device 112 shown in FIGS. 11 and 12. FIG. 14 illustrates an elevational view of the dielectric standoff device 112 shown in FIGS. 11 through 13.

The standoff devices 112 can be formed from one or more dielectric materials, such as polymers. The standoff devices 112 can be connected to the bottom sides 900 of the unit cells 102 in the antenna assembly 100 (e.g., using the fasteners 506 or other types of fasteners). The standoff devices 112 can include a planar central body 1100 and a border body 1102 that extends around, encircles, or frames the central body 1100. The border body 1102 may be formed from several segments 1104A-D, with each segment 1104A-D coupled with an outer edge of the central body 1100. The segments 1104A, 1104B may extend along and be joined with opposite lateral edges of the central body 1100. The segments 1104C, 1104D may extend along and be joined with opposite top and bottom edges of the central body 1100. The central body 1100 and border body 1102 may be molded as a single body, or may be formed from two or more separate bodies that are then coupled with each other.

The segment 1104C may extend along the bottom side 900 of the unit cell 102 to which the standoff device 112 is joined. The opposite segment 1104D may extend along the ground plane or other surface to which the antenna assembly 100 is mounted. For example, the segments 1104D of the standoff devices 112 can be connected with a ground plane that extends along or is coupled with a vertically oriented wall or other surface. As another example, the segments 1104D of the standoff devices 112 can be connected with the ground plane that extends along or is coupled with a horizontally oriented surface. The segments 1104C, 1104D can include through holes 1110 through which fasteners may extend to couple the standoff devices 112 to the unit cells 102 and the ground plane.

The dimensions of the standoff devices 112 can be selected to allow some flexing or movement of the standoff devices 112 in flexible directions 1106, but to prevent flexing or movement (or restrict flexing or movement) of the standoff devices 112 in rigid directions 1108 that are transverse or perpendicular to the flexible directions 1106. Both the directions 1106, 1108 may be parallel to the unit cells 102. The standoff devices 112 may flex, bend, or move such that the segments 1104C, 1104D move relative to each other more along the flexible direction 1106 than in the rigid direction 1108. This can allow for some flexibility in coupling the unit cells 102 with each other using the coupling devices 110 along the flexible direction 1106 while keeping the unit cells 102 more rigidly positioned (and able to move less) along the rigid direction 1108.

The antenna assembly 100 can be mounted to the vertically oriented ground plane or surface with the rigid direction 1108 vertically oriented along or parallel to the vertically oriented ground plane or surface (e.g., the rigid direction 1108 may be vertical). The flexible direction 1106 may be horizontally oriented. This can allow the antenna assembly 100 to flex more in horizontal directions and less in vertical directions to help counteract gravitational forces exerted on the antenna assembly 100. The coupling devices 110 may be more rigid than the standoff devices 112 to ensure that the unit cells 102 remain the fixed distance apart from each other, as described above.

The standoff devices 112 can flex more in the flexible direction 1106 and less (or not at all) along the rigid direction 1108 due to the orientations of the segments 1104A, 1104B of the border body 1102 and the central body 1100. For example, the central body 1100 may be longer along the rigid direction 1108 than the flexible direction 1106 such that the central body 1100 is able to flex more along the flexible direction 1106 than the rigid direction 1108. The segments 1104A, 1104B along the opposite lateral edges of the central body 1100 may be longer in the flexible direction 1106 than the rigid direction 1108, but may be shorter than the central body 1100 along flexible direction 1106, to allow for more flexing or bending of the standoff device 112 along the flexible direction 1106 than the rigid direction 1108.

Figure 15:
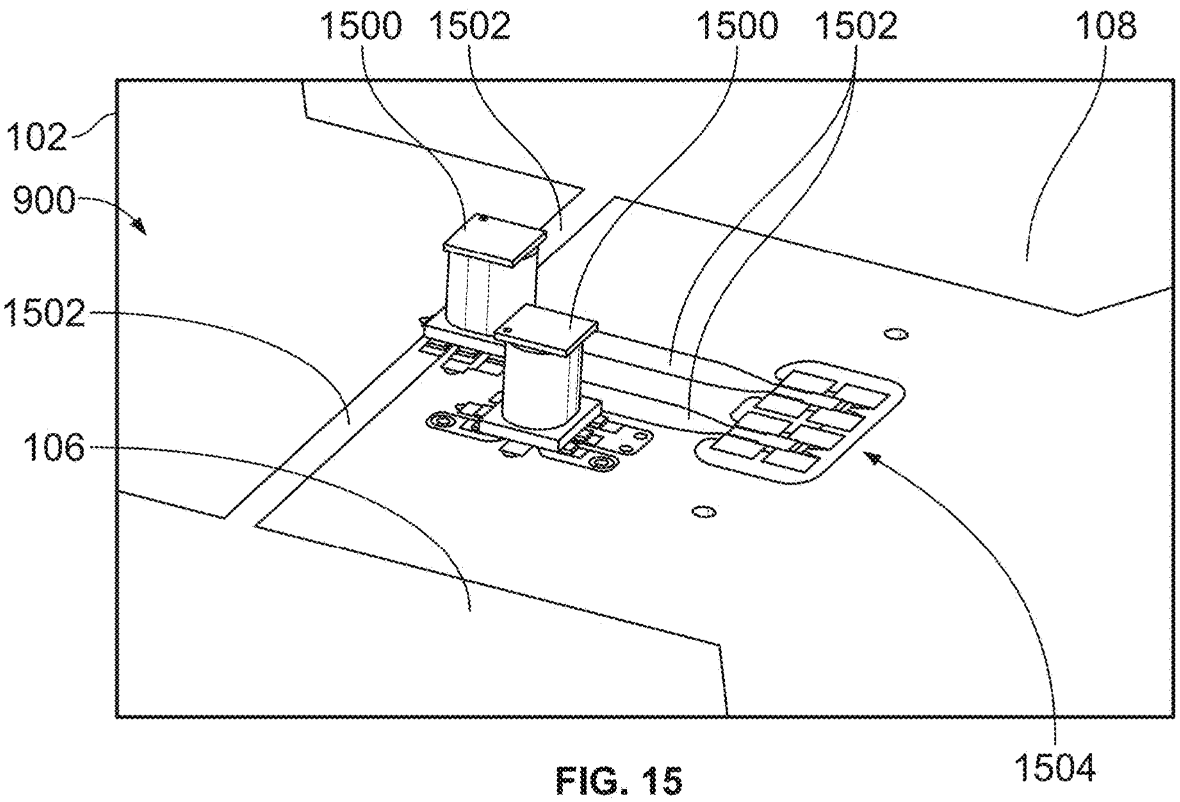
FIG. 15 illustrates one example of the bottom side of one of the unit cells in the antenna assembly shown in FIG. 1.
Figure 16:
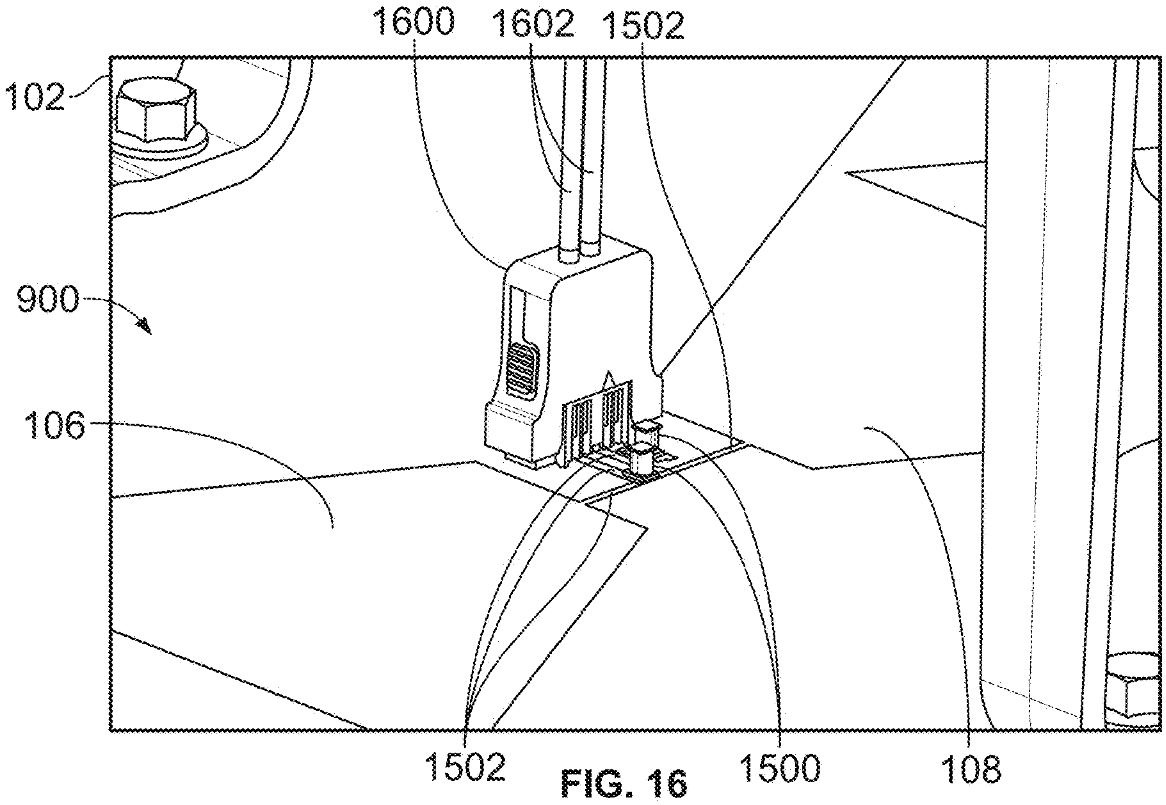
FIG. 16 illustrates the bottom side of the unit cell shown in FIG. 15 with a common connector connected to the unit cell.

FIG. 15 illustrates one example of the bottom side 900 of one of the unit cells 102 in the antenna assembly 100 shown in FIG. 1. FIG. 16 illustrates the bottom side 900 of the unit cell 102 shown in FIG. 15 with a common connector 1600 connected to the unit cell 102. The unit cells 102 may include surface-mounted baluns 1500 connected to a surface mount connector 1504 via conductive pathways 1502. Each balun 1500 may be connected to a different set of the dipole arms 106, 108 of the unit cell 102 by the conductive pathways 1502. For example, the conductive pathways 1502 may be conductive traces in the dielectric board 104 of the unit cell 102, with the conductive pathways 1502 connected to one of the baluns 1500 also connected to one set of the dipole arms 106, 108 in the unit cell 102 and the conductive pathways 1502 connected with the other of the baluns 1500 also connected to the other set of the dipole arms 106, 108 in the unit cell 102.

The common connector 1600 may mate with the connector 1504 to connect two or more conductive pathways 1602 (e.g., cables, such as coaxial cables) with the different sets of the dipole arms 106, 108 in the unit cell 102. For example, one cable 1602 may communicate (e.g., send and receive) signals via one set of the dipole arms 106, 108 for the unit cell 102 to which the common connector 1600 is connected. The other cable 1602 in the same connector 1600 may communicate signals via the other set of the dipole arms 106, 108 for the same unit cell 102. The common connector 1600 may conductively couple one or more computing devices with the antenna assembly 100 for the computing device(s) to communicate via the antenna assembly 100.

The baluns 1500 may increase the bandwidth of the antenna assembly 100 (e.g., relative to the antenna assembly 100 not having the baluns 1500) due to the baluns 1500 providing electrical interfaces between the balanced dipole arms 106, 108 of the antenna assembly 100 and the unbalanced connector 1600. For example, the baluns 1500 can suppress unwanted common mode signals and extend the higher frequency end of the bandwidth of the antenna assembly 100 without compromising (e.g., increasing) the lower frequency end of the bandwidth of the antenna assembly 100. The ground reactance and capacitively-coupled radiating dipole reactance can be tuned to partially cancel each other, thereby leading to a stable, active impedance matches over ultrawide bandwidths and large scan volumes for the antenna assembly 100. The baluns 1500 can allow the unbalanced common connector 1600 to be used, thereby reducing the number of connections required to operate the antenna assembly 100 (e.g., relative to the connector 1600 having fewer cables 1602 or connections).

Figure 17:
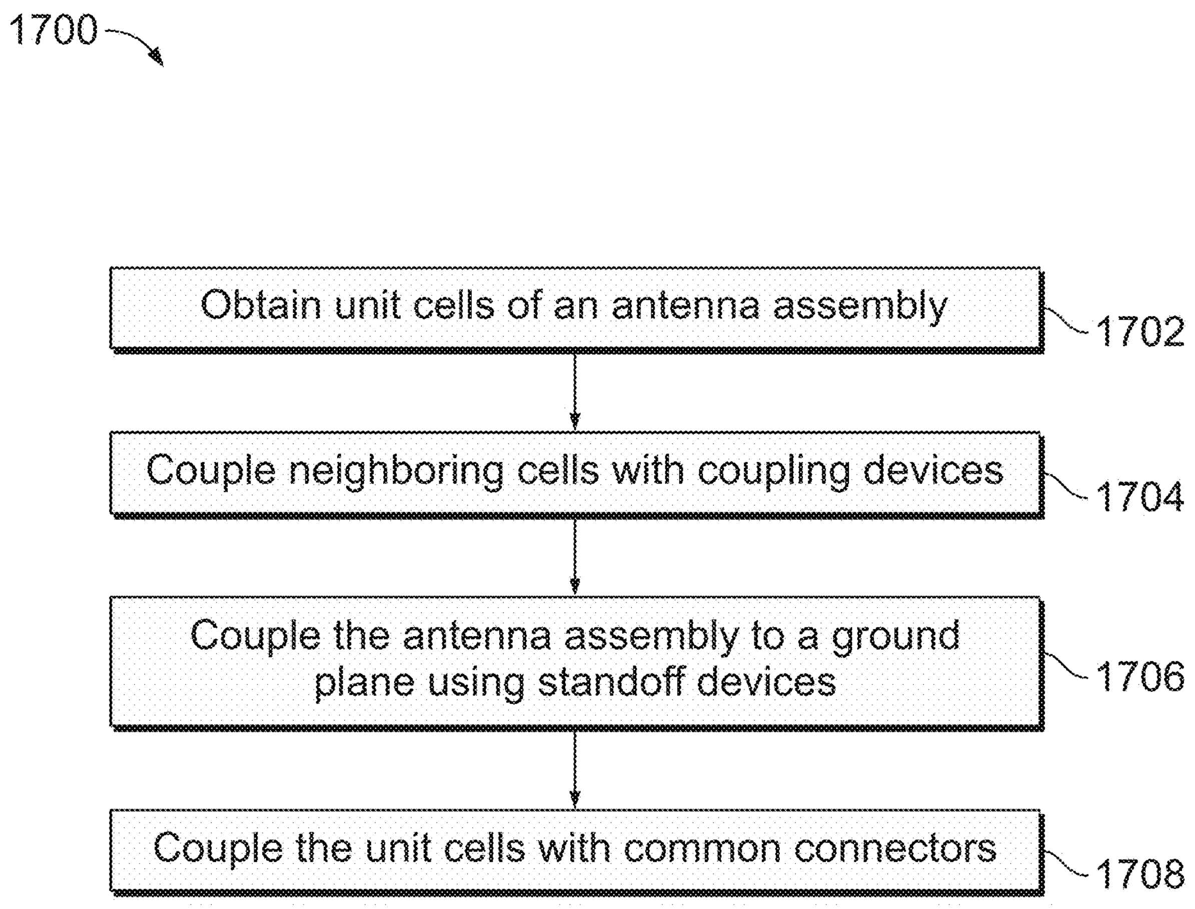
FIG. 17 illustrates a flowchart of one example of a method for forming an antenna assembly.

FIG. 17 illustrates a flowchart of one example of a method 1700 for forming an antenna assembly. The method 1700 can be used to form one or more examples of the antenna assembly 100 described herein. At 1702, unit cells of the antenna assembly are obtained. As described above, each unit cell may include two sets of dipole arms for the antenna assembly. At 1704, the unit cells that neighbor each other are connected with each other by coupling devices. The coupling devices capacitively couple the unit cells with each other while maintaining a desired separation distance or gap between the unit cells, as described above. The coupling devices connect the unit cells together to form the antenna assembly. At 1706, the antenna assembly may be connected with a ground plane using standoff devices described above. At 1708, the unit cells can be connected with common connectors. These connectors can separately connect cables with different sets of the dipole arms via baluns, as described above.

Further, the disclosure comprises examples according to the following clauses:

Clause 1: An antenna assembly comprising: unit cells having dipole arms for communication of radio frequency (RF) signals, the unit cells including first dielectric boards with metallic layers on the dielectric boards forming the dipole arms; and coupling devices connecting neighboring pairs of the unit cells, the coupling devices having second dielectric boards with conductive segments spaced apart from each other, each of the coupling devices connected with and extending between the unit cells in each of the neighboring pairs of the unit cells with each of the conductive segments of each of the coupling devices contacting the first dielectric boards in the unit cells in each of the neighboring pairs.

Clause 2: The antenna assembly of Clause 1, wherein the coupling devices capacitively couple the unit cells in each of the neighboring pairs while maintaining a designated dielectric gap between the unit cells in each of the neighboring pairs.

Clause 3: The antenna assembly of Clause 2, wherein the dielectric boards of the coupling devices have opposite first and second lateral edges and opposite end edges, each of the end edges extending from the first lateral edge to the opposite second lateral edge, the conductive segments of the coupling devices extending from the first lateral edge to the second lateral edge.

Clause 4: The antenna assembly of Clause 1, wherein the second dielectric boards and the conductive segments in each of the coupling devices include first holes through which fasteners extend to couple the unit cells in each of the neighboring pairs with each other.

Clause 5: The antenna assembly of Clause 4, wherein the conductive segments in each of the coupling devices include second holes that are larger than and extend around the first holes.

Clause 6: The antenna assembly of Clause 1, wherein the dipole arms in the unit cells are formed as fractal antennas.

Clause 7: The antenna assembly of Clause 1, wherein the dipole arms in the unit cells include two sets of the dipole arms, and further comprising: baluns mounted to the unit cells, each of the baluns conductively coupled with one of the sets of the dipole arms and configured to be conductively coupled with a common connector for communication of the RF signals via the dipole arms.

Clause 8: The antenna assembly of Clause 1, further comprising: dielectric standoff devices connected to the unit cells and configured to mount the unit cells to a ground plane, the standoff devices shaped to be more flexible along a first direction that is parallel to the unit cells than along a second direction that also is parallel to the unit cells.

Clause 9: An antenna assembly comprising: unit cells having fractal dipole arms for communication of radio frequency (RF) signals; and coupling devices connecting neighboring pairs of the unit cells, the coupling devices having dielectric boards with conductive segments spaced apart from each other, the coupling devices connecting the unit cells in the neighboring pairs with the conductive segments contacting the unit cells to capacitively couple the unit cells with each other and maintain a designated separation gap between the unit cells.

Clause 10: The antenna assembly of Clause 9, wherein the dielectric boards of the coupling devices have opposite first and second lateral edges and opposite end edges, each of the end edges extending from the first lateral edge to the opposite second lateral edge, the conductive segments of the coupling devices extending from the first lateral edge to the second lateral edge.

Clause 11: The antenna assembly of Clause 9, wherein the coupling devices include through holes through which fasteners extend to couple the unit cells with each other.

Clause 12: The antenna assembly of Clause 9, wherein the dipole arms in the unit cells include two sets of the dipole arms, and further comprising: baluns mounted to the unit cells, the baluns conductively coupled with the sets of the dipole arms and configured to be conductively coupled with a common connector for communication of the RF signals via the dipole arms.

Clause 13: The antenna assembly of Clause 9, further comprising: dielectric standoff devices connected to the unit cells and configured to mount the unit cells to a ground plane, the standoff devices shaped to be more flexible along a first direction that is parallel to the unit cells than along a second direction that also is parallel to the unit cells.

Clause 14: A method comprising: obtaining unit cells having dipole arms for communication of radio frequency (RF) signals, the unit cells including first dielectric boards with metallic layers on the dielectric boards forming the dipole arms; and connecting neighboring pairs of the unit cells with coupling devices having second dielectric boards with conductive segments spaced apart from each other, the neighboring pairs of the unit cells connected with each other by the coupling devices with each of the conductive segments of each of the coupling devices contacting the first dielectric boards in the unit cells in each of the neighboring pairs.

Clause 15: The method of Clause 14, wherein the neighboring pairs of the unit cells are capacitively coupled with each other by the coupling devices while maintaining a designated dielectric gap between the unit cells in each of the neighboring pairs.

Clause 16: The method of Clause 15, wherein the neighboring pairs of the unit cells are connected with each other by the coupling devices having the dielectric boards with opposite first and second lateral edges and opposite end edges, each of the end edges extending from the first lateral edge to the opposite second lateral edge, the conductive segments of the coupling devices extending from the first lateral edge to the second lateral edge.

Clause 17: The method of Clause 14, further comprising: placing fasteners through first holes extending through the second dielectric boards and the conductive segments of the coupling devices to couple the neighboring pairs of the unit cells with each other.

Clause 18: The method of Clause 17, wherein the fasteners also are placed through second holes in the conductive segments of the coupling devices, the second holes being larger than and extending around the first holes.

Clause 19: The method of Clause 14, wherein the dipole arms in the unit cells include two sets of the dipole arms, and further comprising: mounting baluns to the unit cells, each of the baluns mounted to be conductively coupled with one of the sets of the dipole arms and to be conductively coupled with a common connector for communication of the RF signals via the dipole arms.

Clause 20: The method of Clause 14, further comprising: connecting dielectric standoff devices to the unit cells and to a ground plane, the standoff devices shaped to be more flexible along a first direction that is parallel to the unit cells than along a second direction that also is parallel to the unit cells.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An antenna assembly comprising:

unit cells having dipole arms for communication of radio frequency (RF) signals, the unit cells including first dielectric boards with metallic layers forming the dipole arms; and coupling devices connecting neighboring pairs of the unit cells, the coupling devices having second dielectric boards with conductive segments spaced apart from each other, each of the coupling devices connected with and extending between the unit cells in each of the neighboring pairs of the unit cells with each of the conductive segments of each of the coupling devices contacting the first dielectric boards in the unit cells in each of the neighboring pairs.

2. The antenna assembly of claim 1, wherein the coupling devices capacitively couple the unit cells in each of the neighboring pairs while maintaining a designated dielectric gap between the unit cells in each of the neighboring pairs.

3. The antenna assembly of claim 2, wherein the second dielectric boards of the coupling devices have opposite first and second lateral edges and opposite end edges, each of the end edges extending from the first lateral edge to the opposite second lateral edge, the conductive segments of the coupling devices extending from the first lateral edge to the second lateral edge.

4. The antenna assembly of claim 1, wherein the second dielectric boards and the conductive segments in each of the coupling devices include first holes through which fasteners extend to couple the unit cells in each of the neighboring pairs with each other.

5. The antenna assembly of claim 4, wherein the conductive segments in each of the coupling devices include second holes that are larger than and extend around the first holes.

6. The antenna assembly of claim 1, wherein the dipole arms in the unit cells are fractal dipole arms.

7. The antenna assembly of claim 1, wherein the dipole arms in the unit cells include two sets of the dipole arms, and further comprising:

baluns mounted to the unit cells, each of the baluns conductively coupled with one of the sets of the dipole arms and configured to be conductively coupled with a common connector for communication of the RF signals via the dipole arms.

8. The antenna assembly of claim 1, further comprising:

dielectric standoff devices connected to the unit cells and configured to mount the unit cells to a ground plane, the standoff devices shaped to be more flexible along a first direction that is parallel to the unit cells than along a second direction that also is parallel to the unit cells, the second direction is transverse or perpendicular to the first direction.

9. An antenna assembly comprising:

unit cells having fractal dipole arms for communication of radio frequency (RF) signals; and coupling devices connecting neighboring pairs of the unit cells, the coupling devices having dielectric boards with conductive segments spaced apart from each other, the coupling devices connecting the unit cells in the neighboring pairs with the conductive segments contacting the unit cells to capacitively couple the unit cells with each other and maintain a designated separation gap between the unit cells.

10. The antenna assembly of claim 9, wherein the dielectric boards of the coupling devices have opposite first and second lateral edges and opposite end edges, each of the end edges extending from the first lateral edge to the opposite second lateral edge, the conductive segments of the coupling devices extending from the first lateral edge to the second lateral edge.

11. The antenna assembly of claim 9, wherein the coupling devices include through holes through which fasteners extend to couple the unit cells with each other.

12. The antenna assembly of claim 9, wherein the dipole arms in the unit cells include two sets of the dipole arms, and further comprising:

baluns mounted to the unit cells, the baluns conductively coupled with the sets of the dipole arms and configured to be conductively coupled with a common connector for communication of the RF signals via the dipole arms.

13. The antenna assembly of claim 9, further comprising:

dielectric standoff devices connected to the unit cells and configured to mount the unit cells to a ground plane, the standoff devices shaped to be more flexible along a first direction that is parallel to the unit cells than along a second direction that also is parallel to the unit cells, the second direction is transverse or perpendicular to the first direction.

14. A method comprising:

obtaining unit cells having dipole arms for communication of radio frequency (RF) signals, the unit cells including first dielectric boards with metallic layers forming the dipole arms; and connecting neighboring pairs of the unit cells with coupling devices having second dielectric boards with conductive segments spaced apart from each other, the neighboring pairs of the unit cells connected with each other by the coupling devices with each of the conductive segments of each of the coupling devices contacting the first dielectric boards in the unit cells in each of the neighboring pairs.

15. The method of claim 14, wherein the neighboring pairs of the unit cells are capacitively coupled with each other by the coupling devices while maintaining a designated dielectric gap between the unit cells in each of the neighboring pairs.

16. The method of claim 15, wherein the neighboring pairs of the unit cells are connected with each other by the coupling devices having the second dielectric boards with opposite first and second lateral edges and opposite end edges, each of the end edges extending from the first lateral edge to the opposite second lateral edge, the conductive segments of the coupling devices extending from the first lateral edge to the second lateral edge.

17. The method of claim 14, further comprising:

placing fasteners through first holes extending through the second dielectric boards and the conductive segments of the coupling devices to couple the neighboring pairs of the unit cells with each other.

18. The method of claim 17, wherein the fasteners also are placed through second holes in the conductive segments of the coupling devices, the second holes being larger than and extending around the first holes.

19. The method of claim 14, wherein the dipole arms in the unit cells include two sets of the dipole arms, and further comprising:

mounting baluns to the unit cells, each of the baluns mounted to be conductively coupled with one of the sets of the dipole arms and to be conductively coupled with a common connector for communication of the RF signals via the dipole arms.

20. The method of claim 14, further comprising:

connecting dielectric standoff devices to the unit cells and to a ground plane, the standoff devices shaped to be more flexible along a first direction that is parallel to the unit cells than along a second direction that also is parallel to the unit cells, the second direction is transverse or perpendicular to the first direction.

* * * * *